Feb. 28, 1939. J. B. DILGER ET AL Re. 21,015
CANDY COATING FEEDING MACHINE
Original Filed June 13, 1935
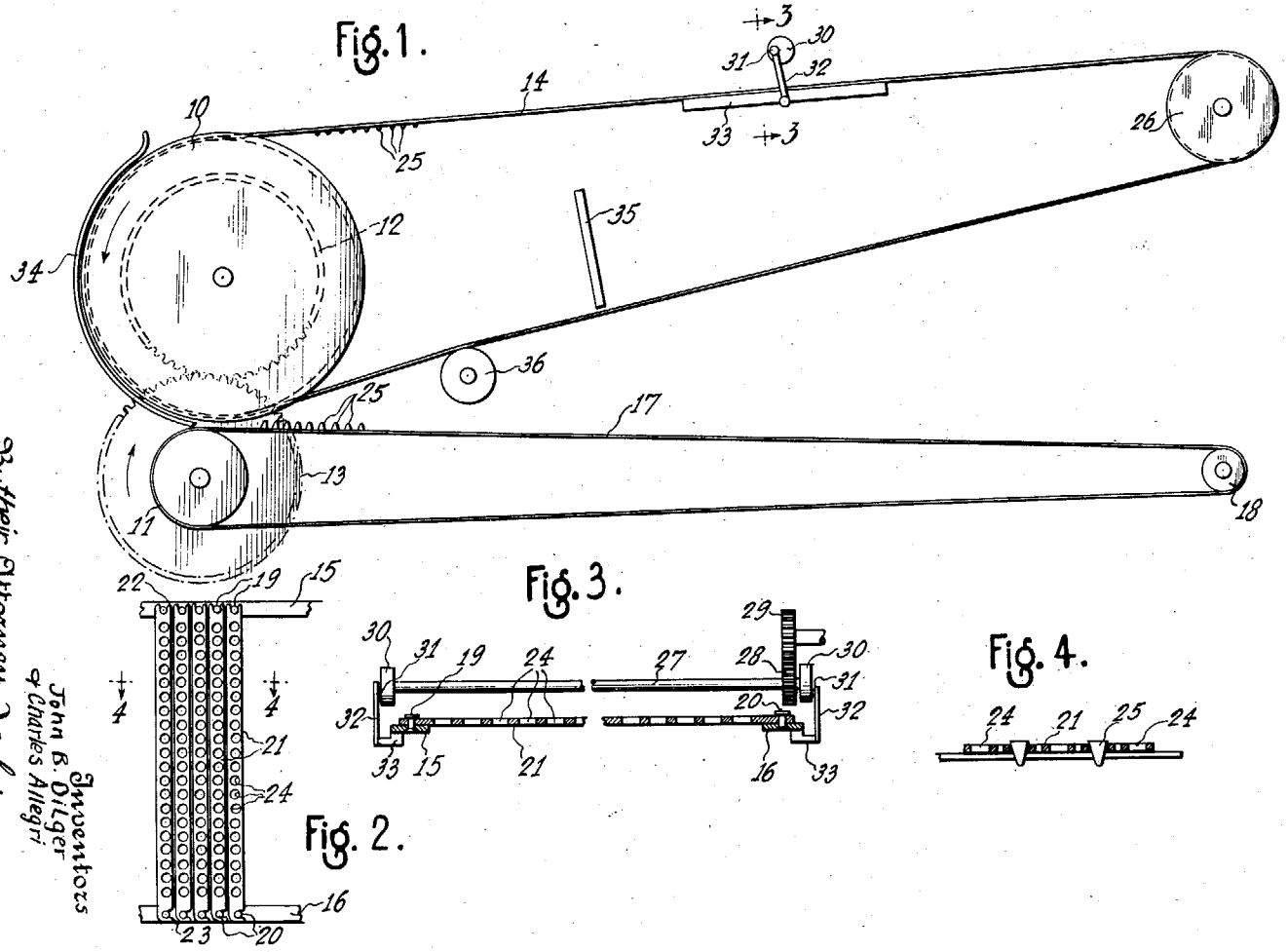
Inventors
John B. Dilger
& Charles Allegri
By their Attorney J. Ledermann Reissued Feb. 28, 1939

Re. 21,015

UNITED STATES PATENT OFFICE 21,015

CANDY COATING FEEDING MACHINE

John B. Dilger, Lyndhurst, and Charles Allegri, Nutley, N. J.

Original No. 2,054,247, dated September 15, 1936, Serial No. 26,438, June 13, 1935. Application for reissue March 21, 1938, Serial No. 197,234

8 Claims. (Cl. 198—30)

This invention relates to machines for feeding products to a coating machine and has special relation to improved means for desirably spacing candy centers and such like products and feeding them in such spaced relation to a coating machine.

The main object of this invention is the provision of a novel feeding device for feeding small candies, nut goods, cakes, biscuits and other food products, chewing gum, and medicine tablets which are to be coated with chocolate or other coating, into a coating machine, in such manner that the candies remain separated from each other while receiving the chocolate or other coating. In the feeding devices commonly used, many of the candies lie too close to each other while being coated, so that upon emergence from the coating machine they are stuck together by the chocolate coating, and such candies must be either discarded as waste, or sold at a loss as "seconds".

The above and other objects will become apparent from the description below, in which characters of reference refer to like-named parts in the accompanying drawing.

Referring briefly to the drawing,

Figure 1 is a schematic side view of the feeding machine.

Figure 2 is a plan view of a section of the conveyor belt on which the candies to be coated are set by an operator.

Figure 3 is a cross-sectional view taken on the line 3—3 of Figure 1.

Figure 4 is a cross-sectional view taken on line 4—4 of Figure 2.

Referring in detail to the drawing, the numerals 10 and 11 represent respectively a large and a small pulley, roller or drum mutually intermeshed by gears 12 and 13 respectively, each gear being co-axial and rigid on its roller. A conveyor belt 14, consisting of a pair of spaced-apart bands or belts 15 and 16, is trained about the ends of the roller 10. A second conveyor belt 17, extending the width of the roller 11, is trained about the latter at one end and about a second roller 18 at the other, the end 18 of this belt lying adjacent to the intake conveyor belt of the chocolate coating machine, not shown. Either the roller 10 or the roller 11 is driven by a motor, not shown.

The band 15 is provided throughout its length with closely spaced-apart pins 19, and the band 16 with similar pins 20. Candy racks 21, which may be made of light metal such as tin or sheet iron which is beaded or otherwise formed to give them rigidity, are bridged across the bands 15 and 16. Each rack 21 has on one end a rounded slot 22 with its mouth at the end of the rack, and at its other end a similar slot 23 with its mouth at the side of the rack. It is obvious that the racks are readily removably mounted on the bands 15 and 16 by having the pins 19 and 20 registering in the slots 22 and 23, respectively.

Each rack 21 has a plurality of holes or openings 24 provided throughout its length. These holes, for candies of the "cream drop" variety illustrated, are circular, although their form may be varied for other shapes of candies.

In operation, the un-coated candies 25—25 are deposited on the front end 26 of the conveyor 14. As all of the candies will not fall peak-down into the holes 24, a shaking mechanism is provided to shake the candies into the holes. This comprises a shaft 27 extending the width of the belt 14 having a pinion 28 on one end driven by a gear 29 from a source of power not shown. At either end of the shaft 27 is a disk 30 having on its outer face an excentric pin 31. A link 32 is pivoted on the pin 31, and at its lower end is provided with a pivoted horizontal tongue 33 engaging the lower edge of the band 15 or 16. While the belt 14 is moving, the gear 29 is rotated rapidly, thus causing a rapid shaking of the belt and causing the candies 25 on the racks 21 to be shaken into the holes 24. To prevent the candies from falling out of the racks while passing around the roller 10, a guard 34 is provided around this roller.

With the candies in the holes of the racks 21, the latter are conveyed around the roller 10, and when they reach the belt 17, the candies drop out of the racks onto the belt 17 in rows and stand upright. The belt 17 then carries them into the coating machine.

It is to be noted that the candies arrive at the coating machine aligned in rows and spaced apart from each other, so that it is impossible for two candies to be pasted together by the chocolate coating. A baffle 35 may be mounted in the path of the rising lower side of the belt 14, to wipe off the racks 21 any candies which may have failed to drop out onto the belt 17. An idler roller 36 may be mounted between the baffle 35 and the roller 10 to increase the slope of the lower portion of the belt 14 on leaving the roller 10.

Obviously, modifications in form and structure may be made without departing from the spirit of the invention.

It should be understood that the application of the invention herein shown and described as being especially adapted and arranged for spacing cone shaped centers for chocolate coated candies is typical merely of various practical applications of the invention and that the invention is not limited to such specific details of construction.

We claim:—

1. A device of the class described comprising a roller having a belt band trained about each end thereof, spaced-apart pins on each of said bands, racks having slotted ends engageable on said pins removably mounted on said bands and bridging said bands, said racks having holes therein adapted to receive candies therein.

2. A device of the class described comprising a roller having a belt band trained about each end thereof, spaced-apart pins on each of said bands, racks having slotted ends engageable on said pins removably mounted on said bands and bridging said bands, said racks being provided with holes adapted to receive candies therein, and means for shaking said bands to cause said candies to fall into said holes.

3. A device of the class described comprising a roller having a belt band trained about each end thereof, spaced-apart pins on each of said bands, racks having slotted ends engageable on said pins removably mounted on said bands and bridging said bands, said racks having holes therein adapted to receive candies, and a guard surrounding one side of said roller to prevent said candies from falling out of said racks while said racks are passing around said roller.

4. A feeding device for candy coating machines and similar apparatus comprising a roller, a belt band trained about each end of said roller, spaced-apart pins on each of said bands, a plurality of racks having slotted ends engageable on said pins removably mounted on said bands and bridging said bands, said racks being provided with holes adapted to receive the candies therein, means for shaking said bands to cause said candies to fall into said holes, a second roller, means for rotating said rollers in proper timed relation, and a conveyor belt trained about said second roller, said latter conveyor belt being adapted to receive the articles to be fed from said racks and feed the same to the respective machine without disturbing the uniform order or arrangement.

5. A feeding device for candy coating machines, and similar apparatus comprising a roller, a belt band trained about each end of said roller, spaced-apart pins on each of said bands, a plurality of racks having slotted ends engageable on said pins removably mounted on said bands and bridging said bands, said racks having holes therein adapted to receive the articles to be coated, a guard surrounding one side of said roller to prevent said articles from falling out of said racks while said racks are passing around said roller, a second roller, means for rotating said rollers in proper timed relation, and a conveyor belt trained about said second roller, said latter conveyor belt being adapted to receive the articles to be fed from said racks and feed the same to the respective machine without disturbing the uniform order or arrangement.

6. In a feeding mechanism for articles such as candy centers and which have bottoms larger than their tops, an endless substantially horizontally arranged conveyor, the conveyor having spaced holes in which the articles are adapted to be suspended upside down by their larger ends, a roller around which the conveyor is trained for reversing the articles, a second conveyor arranged beneath the first said conveyor and upon which the articles are deposited from the said first mentioned conveyor with their smaller ends uppermost, guard means surrounding one side of said roller to prevent said articles from falling out of said holes while passing around said roller, and means for driving the two conveyors in suitable timed relation to preserve the spacing of the articles.

7. The invention as defined in claim 6, and means for shaking the receiving conveyor to cause said articles to fall into said holes.

8. The invention as defined in claim 6, and means associated with the first mentioned conveyor for causing said articles to fall into said holes, and means arranged and adapted to cause any articles which do not drop freely out of said holes onto the second conveyor, to be forced out of said holes.

JOHN B. DILGER.
CHARLES ALLEGRI.